United States Patent [19]
Ashina et al.

[11] Patent Number: 6,022,070
[45] Date of Patent: Feb. 8, 2000

[54] VEHICLE BODY FRAME STRUCTURE

[75] Inventors: Toshiro Ashina; Takashi Chirifu; Akihiro Sukegawa; Sakae Sasaki; Shiyuuichirou Iwatsuki; Takatoshi Miyabe, all of Saitama-ken, Japan

[73] Assignee: Honda Giken Kogyo Kabushiki Kaisha, Tokyo, Japan

[21] Appl. No.: 08/721,435

[22] Filed: Sep. 27, 1996

[30] Foreign Application Priority Data

Sep. 29, 1995 [JP] Japan ..................................... 7-252905
Sep. 24, 1996 [JP] Japan ..................................... 8-251910

[51] Int. Cl.$^7$ .................................................. B62D 21/00
[52] U.S. Cl. ............................................. 296/205; 296/29
[58] Field of Search ..................................... 296/205, 203, 296/29, 30, 203.01; 52/731.3, 731.2, 731.6, 735.1; 403/270, 271, 272, 310, 311, 309, 292

[56] References Cited

U.S. PATENT DOCUMENTS

| | | | |
|---|---|---|---|
| 2,150,651 | 5/1939 | Ewing ..................................... | 403/272 |
| 3,476,413 | 11/1969 | Coberly et al. .......................... | 403/292 |
| 4,333,218 | 6/1982 | Wentworth .......................... | 52/731.6 X |
| 4,986,597 | 1/1991 | Clausen .................................... | 296/205 |
| 5,059,056 | 10/1991 | Banthia et al. ........................ | 296/29 X |
| 5,213,386 | 5/1993 | Janotik et al. ............................. | 296/29 |
| 5,320,403 | 6/1994 | Kazyak .................................. | 403/391 X |
| 5,332,281 | 7/1994 | Janotik et al. ....................... | 296/205 X |
| 5,338,080 | 8/1994 | Janotik et al. ............................. | 296/29 |
| 5,454,661 | 10/1995 | Litvin et al. ......................... | 403/292 X |
| 5,593,245 | 1/1997 | Herz et al. .............................. | 296/30 X |
| 5,839,777 | 11/1998 | Vlahovic .................................. | 296/205 |

FOREIGN PATENT DOCUMENTS 404038277 2/1992 Japan ....................................... 296/29

*Primary Examiner*—D. Glenn Dayoan
*Assistant Examiner*—Jason Morrow
*Attorney, Agent, or Firm*—Armstrong, Westerman, Hattori, McLeland and Naughton

[57] ABSTRACT

A vehicle body frame structure is comprised of plurality of loop-shaped members each formed by a hollow pieces extruded from a light alloy. Each loop-shaped member is polygonal in cross section. The vehicle body frame structure is partly formed by a plurality of such loop-shaped members joined sidewise together. Each loop-shaped member is comprised of at least two hollow extruded pieces joined together by a core coupling or a split muff coupling. Part of each loop-shaped member is stepped so that it can be joined with a companion loop-shaped member by mating the stepped portions of the two loop-shaped members one over the other.

16 Claims, 10 Drawing Sheets

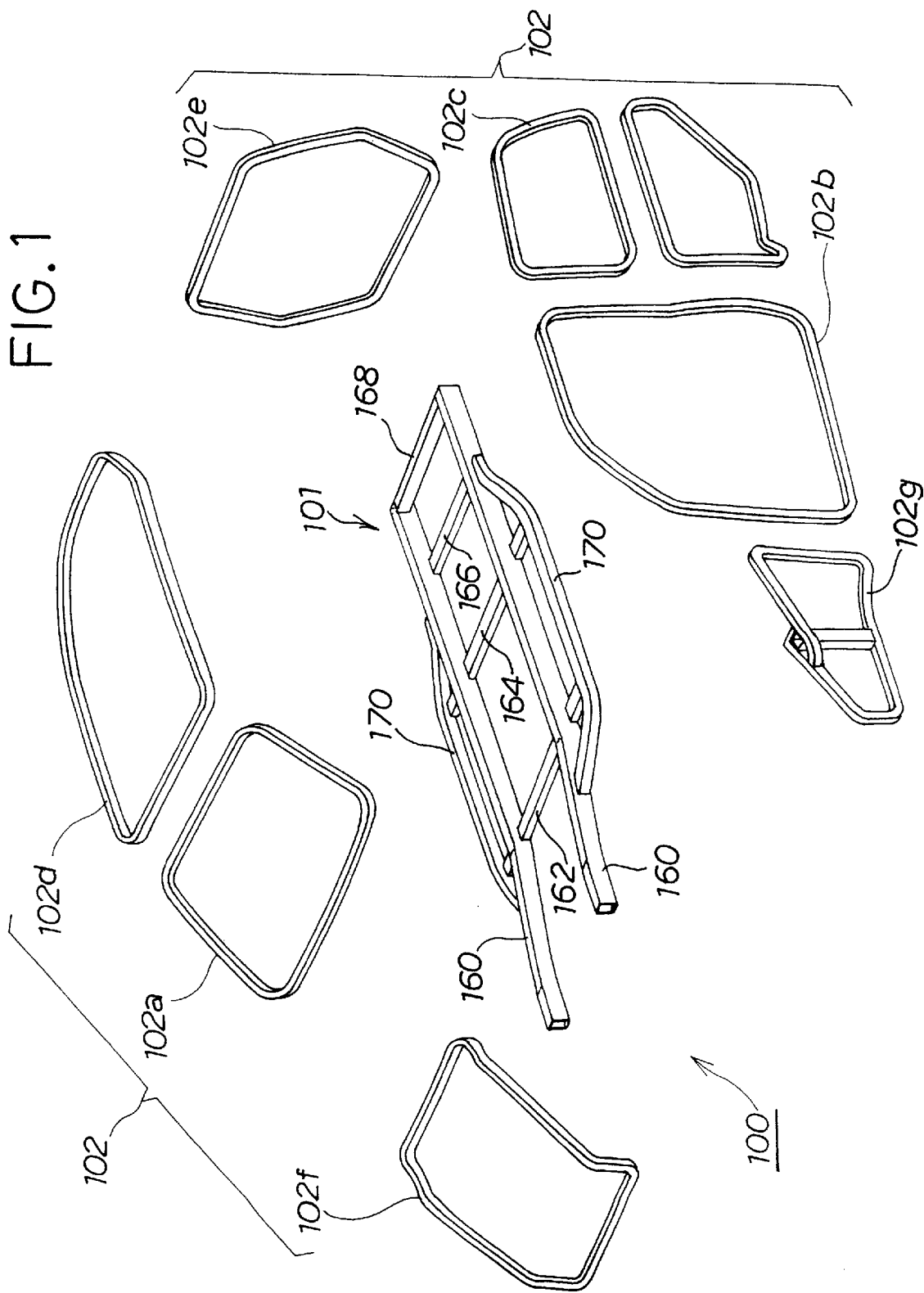

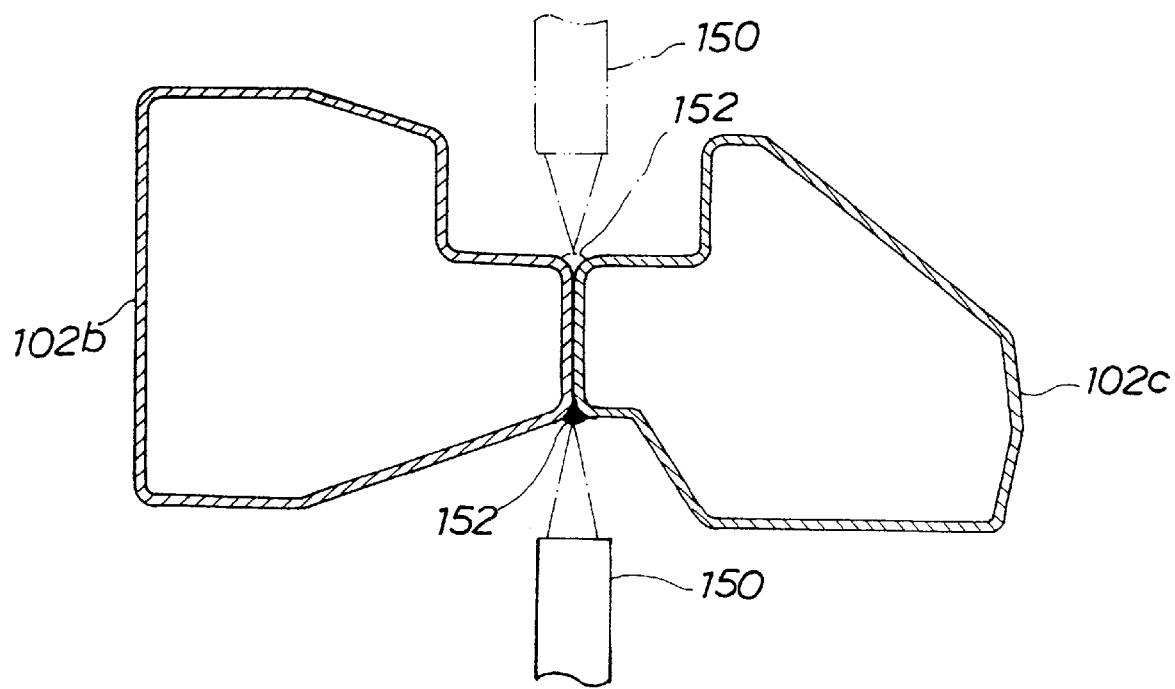

FIG.15
PRIOR ART
FIG.16
PRIOR ART
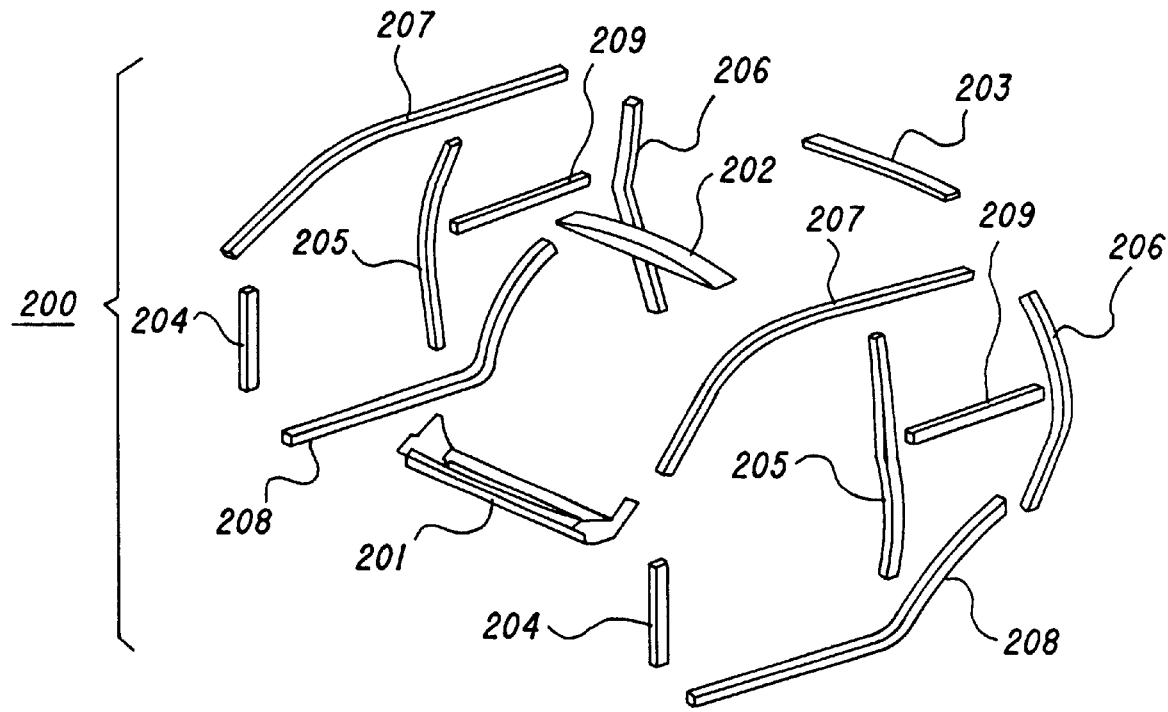
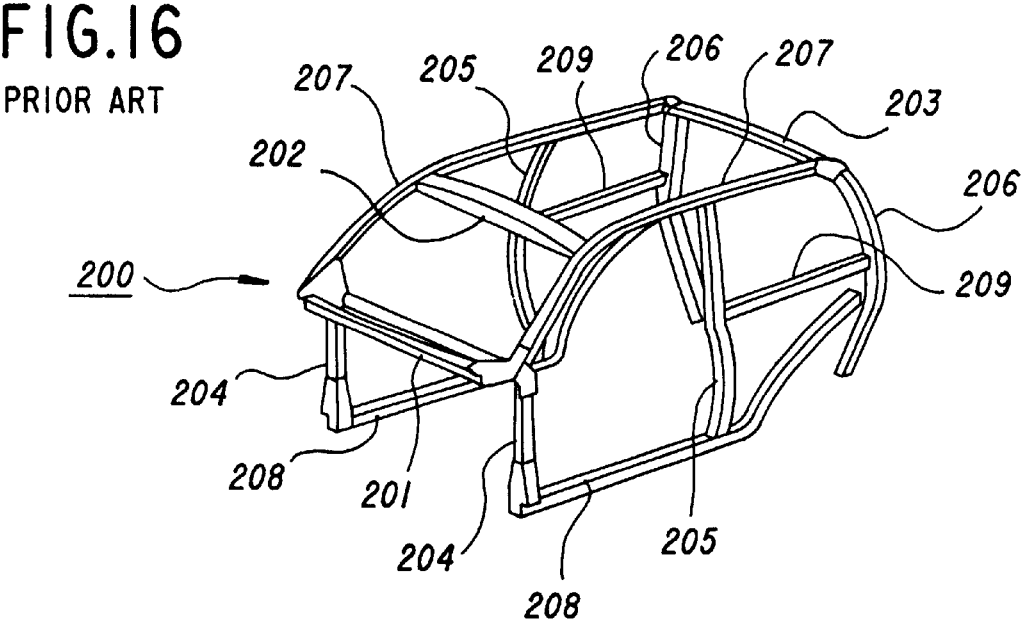

VEHICLE BODY FRAME STRUCTURE

BACKGROUND OF THE INVENTION

1. Field of the Invention

The present invention relates to an improvement in a body frame structure forming a skeletal structure of a vehicle.

2. Description of the Related Art

One example of conventional body frames of four-wheeled vehicles is shown in exploded perspective in FIG. 15 hereof. As seen from this figure, the body frame 200 includes principal skeletal members such as a front ceiling cross member 201, central ceiling cross member 202, rear ceiling cross member 203, front pillars 204, 204, center pillars 205, 205, rear pillars 206, 206, top longitudinal members 207, 207, bottom longitudinal members 208, 208 and intermediate members 209, 209, all of which have been obtained by cold punching and/or press bending metal plates.

The vehicle body frame 200 as assembled is shown in FIG. 16. The principal skeletal members, namely, front, center and rear ceiling cross members 201, 202, 203, front pillars 204, 204, center pillars 205, 205, rear pillars 206, 206, top longitudinal members 207, 207, bottom longitudinal members 208, 208 and intermediate members 209, 209 are connected together by spot welding or the like technique to form the body frame structure 200.

Since the skeletal members have hitherto been manufactured by cold punching metal plates, fragments or odd pieces have been produced, thus worsening the yield. Further, a large number of components or members have been required, because the skeletal structure has been formed by combining substantially linear members 201–209. This requires a multitude of man-hours for drafting drawings of, making plans for the manufacture of, manufacturing, temporarily assembling and welding the members, thus increasing the cost of manufacture of the body frame.

SUMMARY OF THE INVENTION

During a research to take a fresh look at the conventional method of manufacture of an ordinary vehicle body frame as described above, the present inventors have realized that the body frame is a synthetic body of loops, which fact has led to the present invention.

According to the present invention, there is provided a vehicle body frame structure comprising a plurality of loop-shaped members joined together sidewise to form part or whole of the body frame structure, the loop-shaped members being hollow and formed by extruding a light alloy.

With this arrangement, it becomes possible to enhance the yield, because the hollow loop-shaped members extruded from a light alloy are employed to form the body frame structure and hence little odd pieces or fragments are produced.

Since the loop-shaped members take the form of elongate pipes, they can be easily bent, thus enabling high precision processing thereof. By sidewise joining, that is, bundling of the loop-shaped members, a thick body frame of high rigidity can be provided. Further, since a laser welding method is employed to effect the sidewise connection of the loop-shaped member, it becomes possible to reduce the undesirable thermal distortion.

One loop-shaped member is equivalent to approximately four conventional linear members. Thus, combination of the loop-shaped members enables substantial reduction of the number of members required to form the body frame structure and hence the costs corresponding to the man-hours required in drafting drawings of, making plans for the manufacture of, manufacturing, temporarily assembling and welding frame members.

Since the body frame structure is formed partially or wholly by the loop-shaped members joined sidewise, it becomes possible to avoid using conventional large-sized press installations and to use, in their stead, simple and inexpensive installations for manufacturing the body frame structure.

In a specific form of the invention, the loop-shaped members form a front glass frame for receiving a pane of front glass. A door opening frame for holding a door, a quarter glass frame for securing a small pane of glass to be fit into a quarter window, roof frames as a ceiling skeletal structure, a tail gate opening frame for mounting a tail gate, and a bonnet opening frame for mounting a bonnet.

Since the vehicle body openings are thus formed by precisely dimensioned loop-shaped members, seal members can be positioned with high precision, whereby seal effect around the openings is increased.

In the conventional vehicle body frame, the connection between a center pillar top and a roof, for example, is achieved by a T-shaped coupling established by abutting the pillar top against an intermediate portion of a longitudinal beam. By contrast, in the present invention, three loop-shaped members come together to form a three-forked structure, thus providing increased rigidity to the connection compared to the conventional arrangement. Further, since most part of the vehicle body frame can be formed by the loop-shaped members, the body frame can be produced easily by simple and inexpensive installations, without the use of the conventional large-sized press installations.

Preferably, each loop-shaped member is formed from at least two hollow extruded pieces joined together endwise by means of a core coupling. The loop-shaped member can be produced easily by thus combining a plurality of hollow extruded pieces without the use of expensive bender installations.

Some or all of the loop-shaped members may be provided with longitudinally-extending stepped portions so that one loop-shaped member can be joined sidewise with another loop-shaped member by mating the respective stepped portion surfaces one over the other. As a result, even when the loop-shaped members incorporate a twist, they can be joined together with the twist being mitigated by the step-on-step mating of the respective stepped portions, whereby the members can be easily produced with predetermined precision.

Each loop-shaped member may be formed from at least two hollow extruded pieces joined together by means of a clamp coupling. As a result, the loop-shaped members can be easily produced by simply combining a plurality of such hollow extruded pieces together, without the use of expensive bender installations.

Preferably, two adjacent loop-shaped members are joined together by means of a clamp coupling. By connecting two adjacent loop-shaped members by such coupling, increased rigidity can be easily exerted to the vehicle body frame.

Additional advantages and features of the present invention will become apparent from the following description and appended claims, taken in conjunction with the accompanying drawings.

BRIEF DESCRIPTION OF THE DRAWINGS

FIG. 1 is an exploded perspective view of a four-wheeled vehicle body frame structure according to the present invention;

FIG. 3 is a cross-sectional view illustrating a mode of connection of two frames according to the present invention;

FIG. 15 is an exploded perspective view illustrating a conventional four-wheeled vehicle body frame structure; and FIG. 16 is a schematic perspective view illustrating the vehicle body frame structure.

DETAILED DESCRIPTION OF THE PREFERRED EMBODIMENT

Figure 2A:
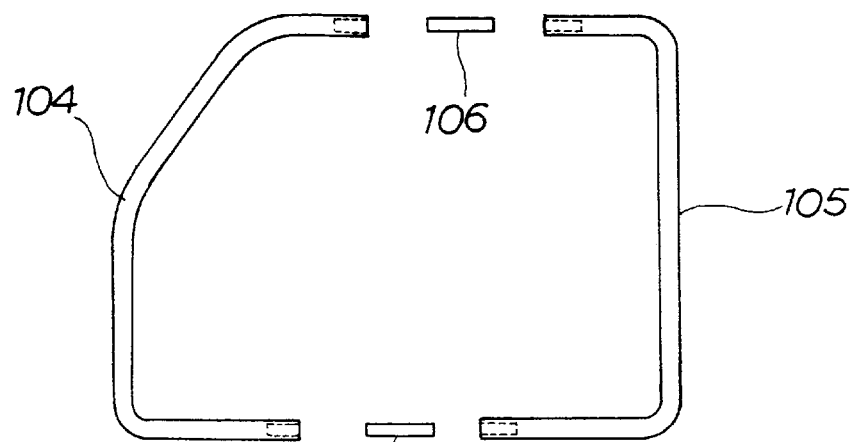
FIG. 2A–FIG. 2C are views illustrative of a manner of making loop-shaped members according to the present invention.

Preferred embodiments of the present invention will be described below with reference to the accompanying drawings. The term "loop-shaped members" used herein should be construed as annular members obtained by extruding raw materials of light alloy into hollow members and bending (and, where necessary, drawing and pressing) the latter. The term "vehicle body frame" should be construed as a vehicle skeletal structure formed by combining a plurality of such loop-shaped members.

Referring initially to FIG. 1, a vehicle body frame 100 is comprised of a platform 101 and a plurality of loop-shaped members 102. The loop-shaped members 102 form a windshield glass frame 102a for fitting a windshield glass, a door opening frame 102b for mounting a door, a quarter glass frame 102c for fitting a small rear window glass, a roof rail frame 102d as a skeletal structure of a ceiling, a tail gate opening frame 102e for mounting a tail gate, and a bonnet opening frame 102f for mounting a bonnet, which jointly form the vehicle body frame 100. The platform 101 is comprised of right and left side members 160, 160, a plurality of cross members 162, 164, 166, 168, and right and left sub-members 170, 170.

Figure 2B:
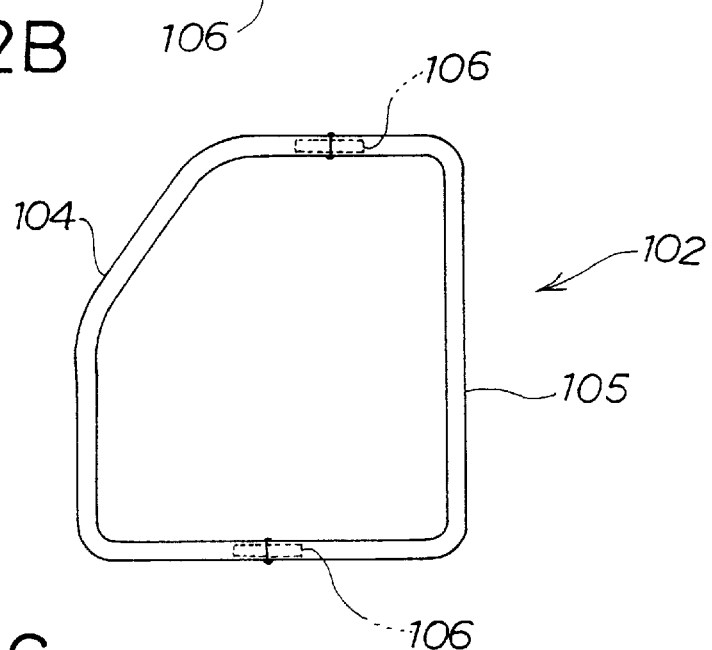
Figure 2C:
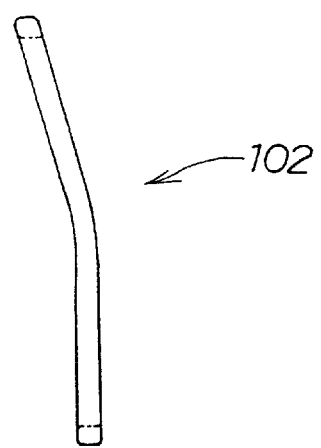

Reference is now made to FIG. 2A–FIG. 2C in which a mode of production of the loop-shaped members is shown.

As shown in FIG. 2A, there are firstly provided hollow extruded pieces 104, 105 obtained by extruding light alloys such as aluminum alloys, magnesium alloys and titanium alloys and bent into substantially U-shaped configurations, and core couplings 106, 106 each having an external diameter which is substantially equal to an internal diameter of each hollow extruded piece.

The loop-shaped member 102 is then produced by connecting the hollow extruded pieces 104, 105 by means of the core couplings 106, 106, as shown in FIG. 2B.

In FIG. 2C, there is shown one loop-shaped member 102 bent at a longitudinal center thereof.

By thus connecting more than two hollow extruded pieces 104, 105 by means of the core couplings 106, 106, the loop-shaped member 102 can be produced with ease.

Turning to FIG. 3, there is shown a mode of connection of two companion frames according to the present invention. As an example, the door opening frame 102b and quarter glass frame 102c are abutted against each other, and upper and lower edge portions of the abutting surfaces of the frames are fuse connected by a laser torch 150. The beads 152 extend in a front-to-back direction of the figure sheet, thus providing high rigidity to the connection.

Figure 4:
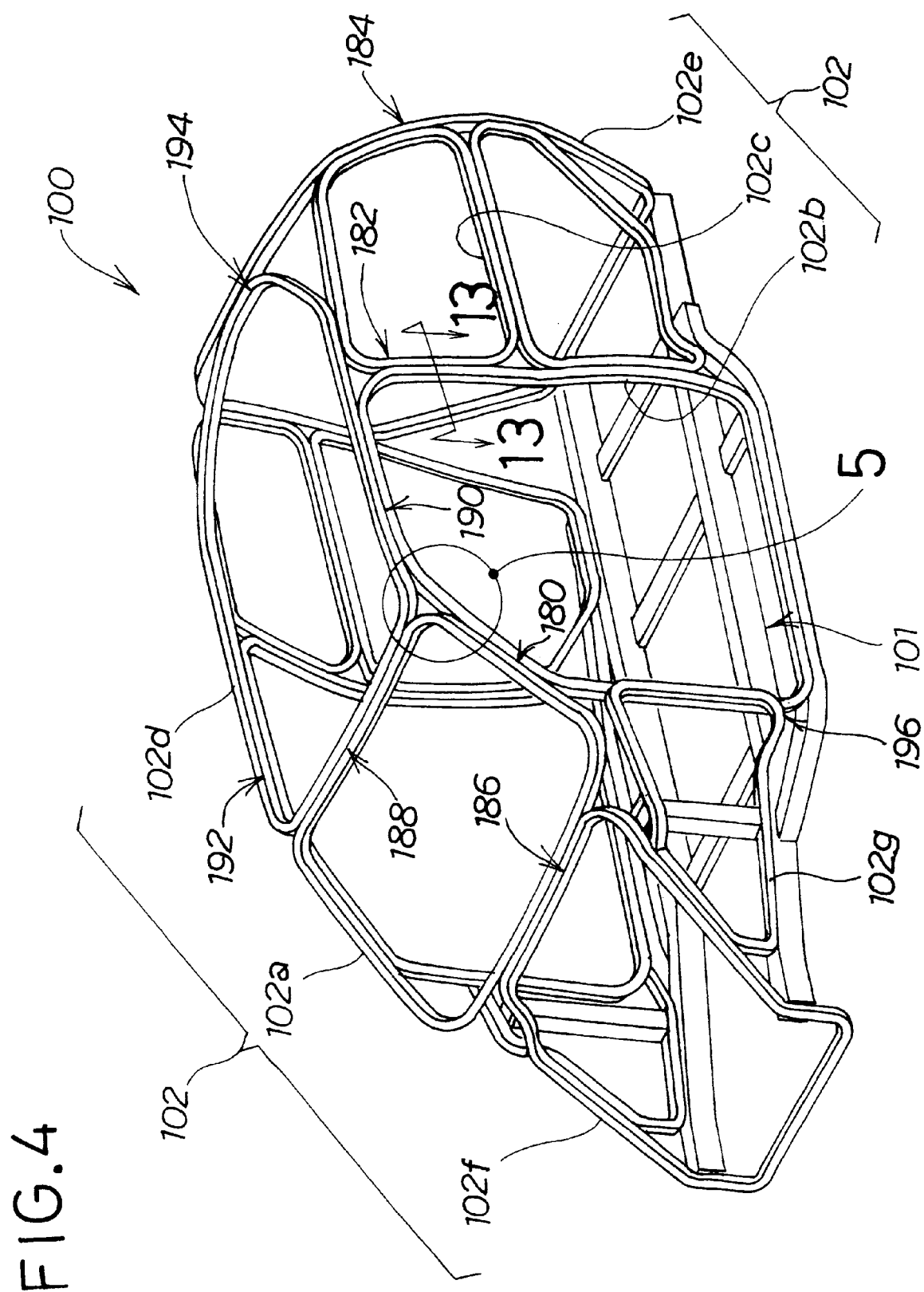
FIG. 4 is a schematic perspective view illustrating the four-wheeled vehicle body frames as assembled.

FIG. 4 schematically shows the four-wheeled vehicle body frame as assembled. The platform 101 carries the vehicle body frame 100 as assembled by joining the door opening frame 102b, quarter glass frame 102c, roof frame 102d, windshield glass frame 102a, bonnet opening frame 102f and tail gate opening frame 102e together sidewise.

Designated by numeral 5 in circle is a T-shaped portion at which three members, namely, windshield glass frame 102a, door opening frame 102b and roof frame 102d come together.

In a conventional vehicle body, the above-mentioned portion takes the form of a T-shaped coupling presented by abutting an end of a cross beam against an intermediate portion of a longitudinal beam and welding the point of abutment. By contrast to the T-shaped coupling of the two members, the T-shaped portion of FIG. 4 has a three-forked construction formed by three members coming together, whereby higher rigidity is established at the three-forked connection compared to the conventional arrangement. As can be seen from the figure, there are provided other three-forked portions than the one designated by 5 in circle.

As shown in FIG. 4, an upper front pillar 180 is formed by connecting right and left sides of the windshield glass frame 102a with one side of the door opening frame 102b lengthwise.

Upper center pillar 182 is formed by connecting a front side of the quarter glass frame 102c with part of a side of the door opening frame 102b lengthwise.

Likewise, upper rear center pillar 184 is formed by connecting a rear side of the quarter glass frame 102c with part of a side of the tail gate opening frame 102e lengthwise.

Cowl frame 186 is formed by connecting a lower side of the windshield glass frame 102a with an upper side of the bonnet opening frame 102f lengthwise.

Front roof rail 188 is formed by joining together a front edge of the roof frame 102d and an upper edge of the windshield glass frame 102a.

Left and right roof rails 190, 192 are formed by joining right and left edges of the the roof frame 102d and the respective upper edges of the door opening frame 102b together.

Rear roof rail 194 is formed by joining a rear edge of the roof frame 102d and an upper edge of the tail gate opening frame 102e together.

Side frame complex 196 is formed by joining the door opening frame 102b, quarter glass frame 102c and a front side frame 102g together.

Figure 5:
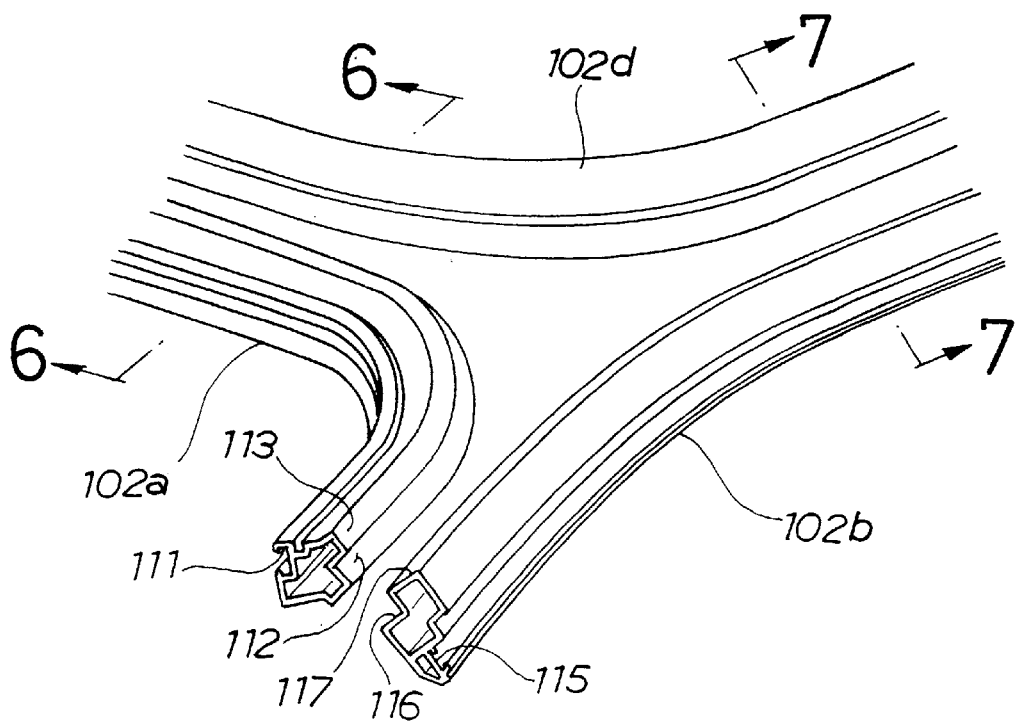
FIG. 5 is an exploded perspective view illustrating a portion 5 of FIG. 4 on an enlarged scale.

FIG. 5 is an exploded perspective view showing, on an enlarged scale, the T-shaped portion designated by numeral 5 in FIG. 4, at which the windshield glass frame 102a, door opening frame 102b and roof frame 102d come together.

Windshield glass frame 102a is a hollow member having a recess 111, a first surface 112 and a second surface 113, the first and second surfaces 112, 113 jointly defining stepped portions or surfaces.

Similarly, the door opening frame 102b is a hollow member having a recess 115, a first surface 116 and a second surface 117, the first and second surfaces 116, 117 jointly defining stepped portions or surfaces.

Figure 6:
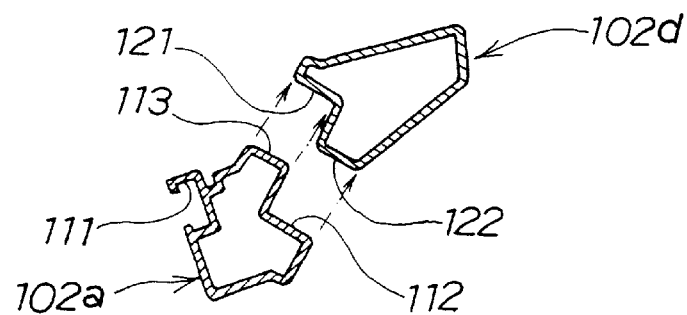
FIG. 6 is a cross-sectional view taken along line 6—6 of FIG. 5.

FIG. 6 is a cross-sectional view taken along line 6—6 of FIG. 5. The roof frame 102d is also a hollow member having a first surface 121 and a second surface 122, which jointly define stepped portions or surfaces. Thus, the second surface 113 of the windshield glass frame 102a can be laid over the first surface 121 of the roof frame 102d while the first surface 112 of the windshield glass frame 102a can be laid over the second surface 122 of the roof frame 102d.

Figure 7:
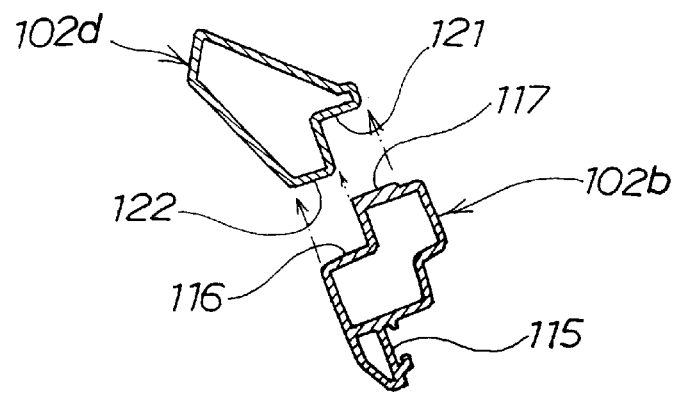
FIG. 7 is a cross-sectional view taken along line 7—7 of FIG. 5.

FIG. 7 is a cross-sectional view taken along line 7—7 of FIG. 5. The second surface 117 of the door opening frame 102b can be laid over the first surface 121 of the roof frame 102d while the first surface 116 of the door opening frame 102b can be laid over the second surface 122 of the roof frame 102d.

Figure 8:
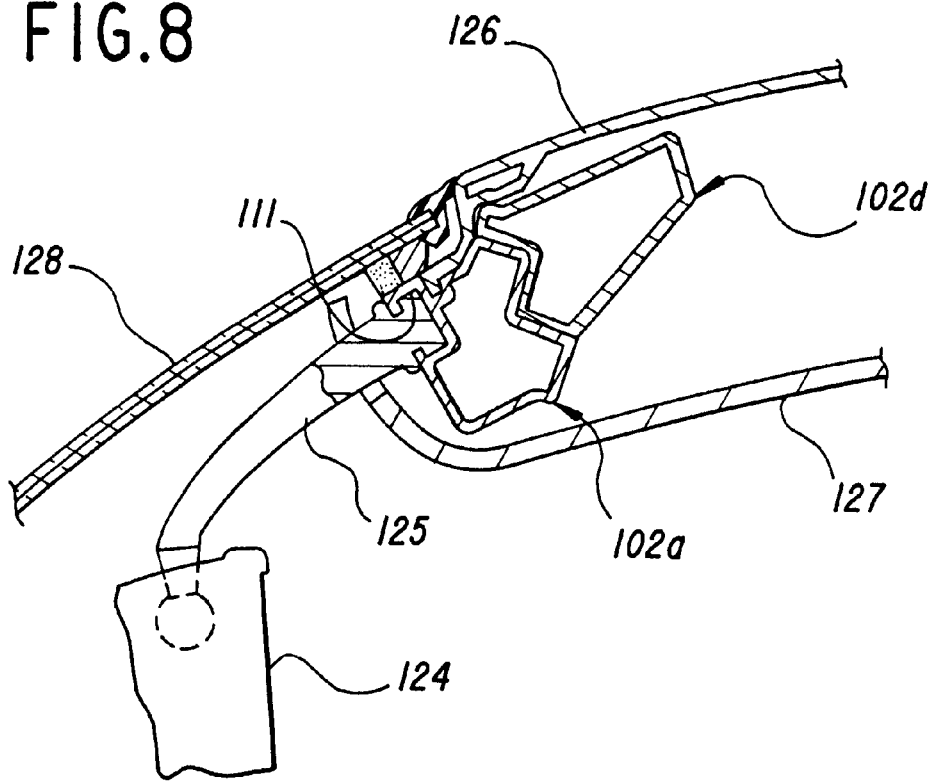
FIG. 8 is a cross-sectional view illustrating the connection between a front glass frame and a roof frame.

In FIG. 8, there is shown in cross-section the connection between the windshield glass frame and roof frame. The roof frame 102d is mated and weld connected with the windshield glass frame 102a. Base portion of an arm 125 of a rear-view mirror 124 is received in a recess 111 of the windshield glass frame 102a. Roof 126, interior lining 127 and windshield glass 128 are also shown to have been attached to the body frame.

Figure 9:
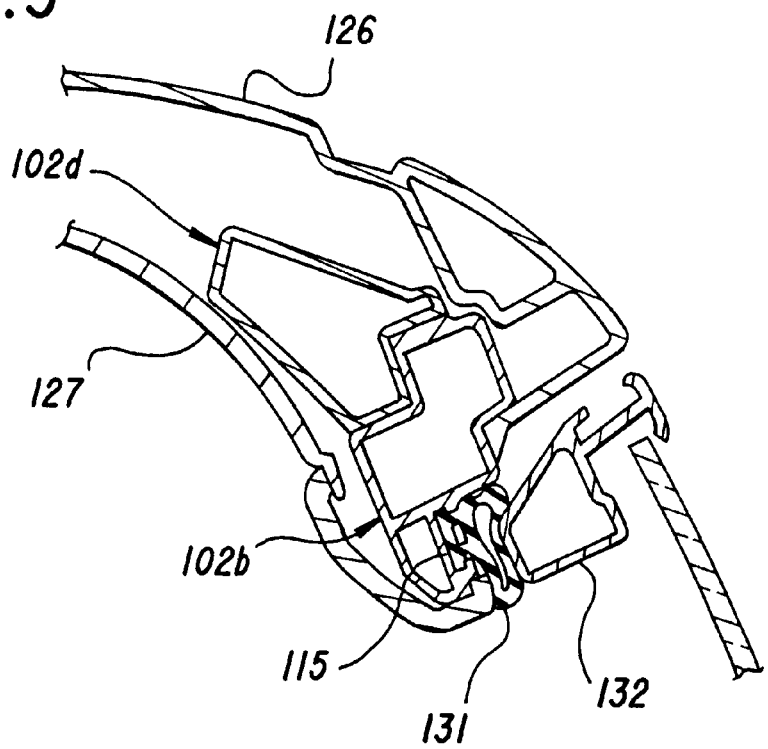
FIG. 9 is a cross-sectional view illustrating the connection between a door opening frame and the roof frame.

Turning to FIG. 9, there is shown in cross-section the connection between the door opening frame and roof frame. The roof frame 102d is mated and weld connected with the door opening frame 102b. Base portion of a door bearing packing 131 is received in a recess 115 of the door opening frame 102b. Roof 126, interior lining 127 and door frame 132 are also shown to have been attached.

As thus far explained, the loop-shaped member 102 is designed to have stepped surfaces so that it can be mated with a companion loop-shaped member with the stepped surfaces of the two members laid one over the other. By thus joining a pair of loop-shaped members 102, 102, the two members can be nicely joined even when they incorporate a twist, thus removing concerns over the occurrence of inappropriate connections. It may readily be appreciated by those skilled in the art that the stepped surfaces should be provided only at those portions of the loop-shaped members that are required to serve for connection.

Figure 10A:
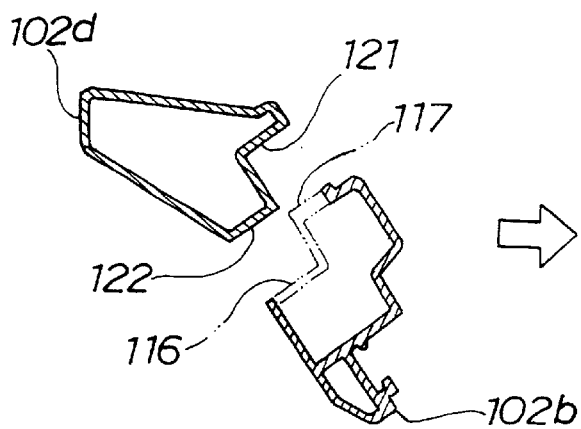
FIG. 10A and FIG. 10B are cross-sectional views illustrating alterations of the connection between the frames (loop-shaped members) shown in FIG. 9.
Figure 10B:
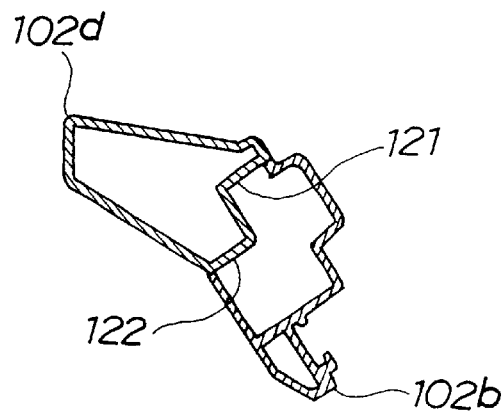

FIG. 10A and FIG. 10B show, in cross-section, altered connections between the loop-shaped members.

In FIG. 10A, the first and second surfaces 116 and 117 may be omitted when the roof frame 102d and door opening frame 102b, for example, are connected.

As shown in FIG. 10B, when the roof frame 102d and door opening frame 102b are joined together, the first and second surfaces 121 and 122 of the roof frame 102d jointly define a central partition wall, whereby increased flexural rigidity is imparted to the connection. Further, it becomes possible to make the body frame lighter in weight compared to the arrangement of FIG. 9.

Figure 11A:
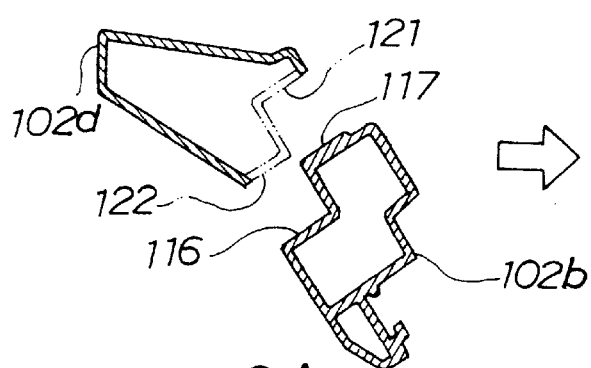
FIG. 11A and FIG. 11B are cross-sectional views illustrating a further alteration of the connection between the loop-shaped members.
Figure 11B:
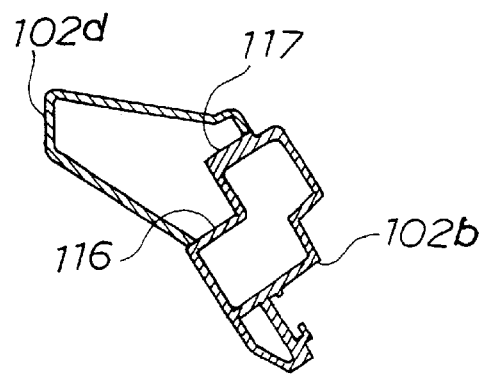

FIG. 11A and FIG. 11B are cross-sectional views similar to FIG. 10A and FIG. 10B but showing separate alterations of the connection between the loop-shaped members.

When joining the roof frame 102d with the door opening frame 102b, the first and second surfaces 121 and 122 of the roof frame 102d, for example, may be omitted, as shown in FIG. 11A.

As the roof frame 102d and door opening frame 102b are joined together, the first and second surfaces 116 and 117 of the door opening frame 102b jointly define a central partition wall as shown in FIG. 11B, whereby increased flexural rigidity is imparted to the connection. Further, it becomes possible to make the body frame lighter in weight compared to the arrangement of FIG. 9.

Figure 12A:
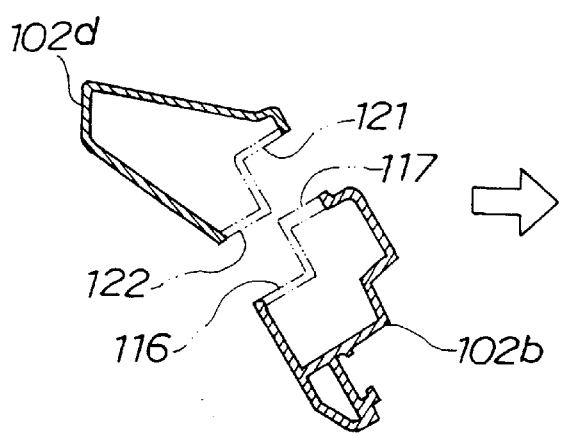
FIG. 12 and FIG. 12B are cross-sectional views illustrating a further alteration of the connection between the loop-shaped members.
Figure 12B:
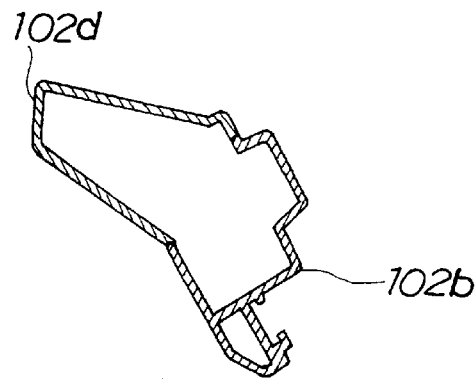

FIG. 12A and FIG. 12B are cross-sectional views similar to FIG. 11A and FIG. 11B but showing still further alterations of the connection between the loop-shaped members.

As shown in FIG. 12A, when connecting the roof frame 102d with the door opening frame 102b, the first and second surfaces 121 and 122 of the roof frame 102d, as well as the first and second surfaces 116 and 117 of the door opening frame 102b may be omitted.

In FIG. 12B, the roof frame 102d and door opening frame 102b are joined together, whereby a hollow member of large cross-section can be provided.

Figure 13A:
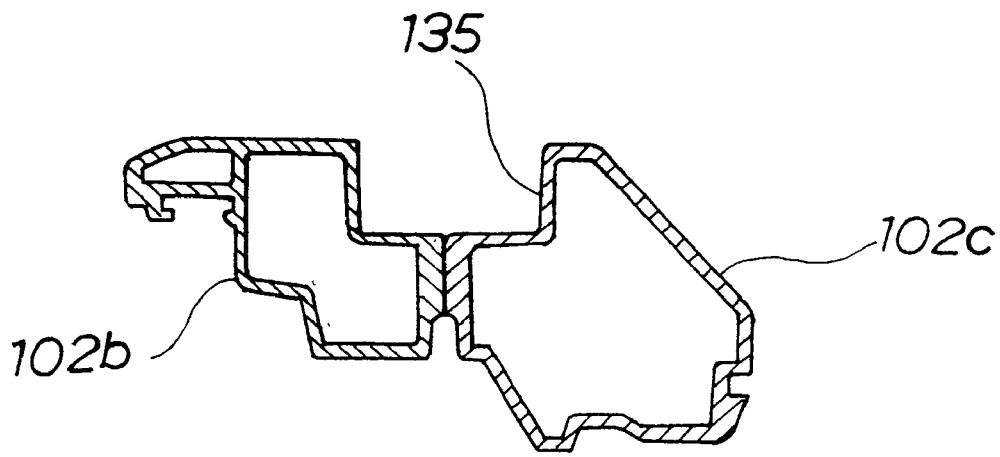
FIG. 13A is a cross-sectional view taken along line 13—13 of FIG. 4.
Figure 13B:
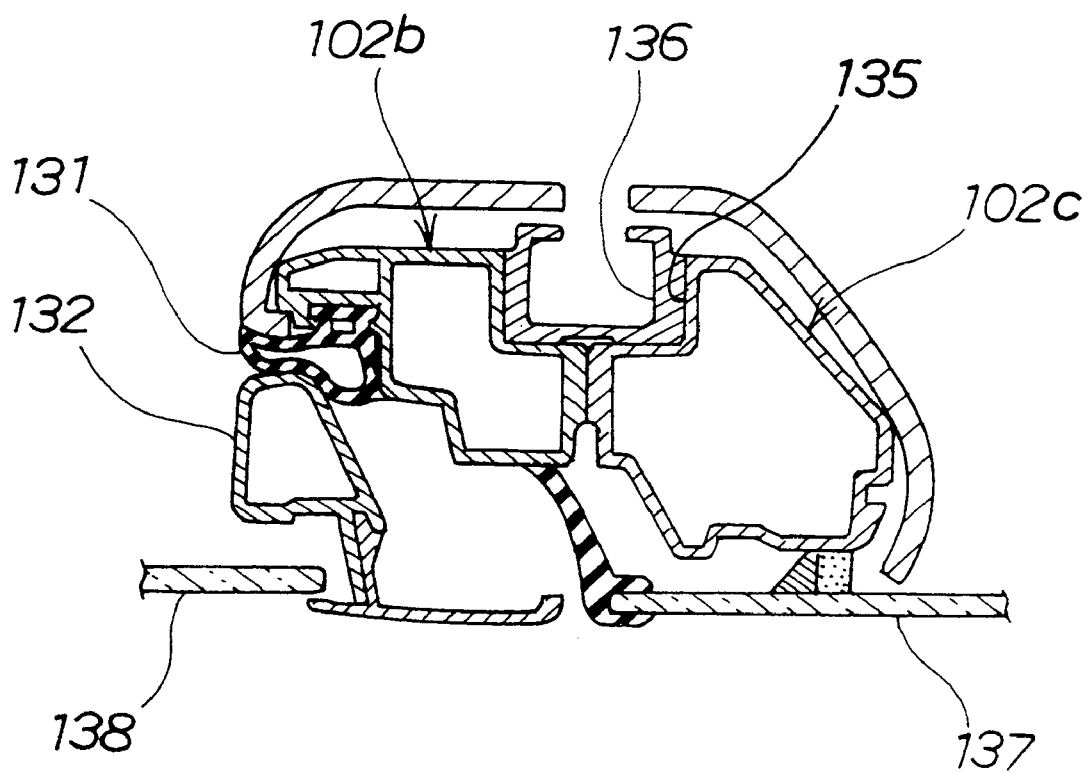
FIG. 13B is a cross-sectional view illustrating a rail received in a recess defined by the door opening frame and a quarter glass frame in abutment therewith.

FIG. 13A is a cross-sectional view taken along line 13-13 of FIG. 4. By mating the door opening frame 102b with the quarter glass frame 102c, there is provided a large or deep recess 135.

To this end, rail 136 may be fitted into the recess 135 so that the rail 136 acts to firmly connect the door opening frame 102b with the quarter glass frame 102c. The rail 136 may be arranged to serve not only as a reinforcing member but also as a curtain rail for an interior curtain. Numerals 137 and 138 designate a quarter glass and a door glass, respectively.

FIG. 14A–FIG. 14D are schematic perspective views illustrating clamp or split muff couplings and their applications according to the present invention.

Figure 14A:
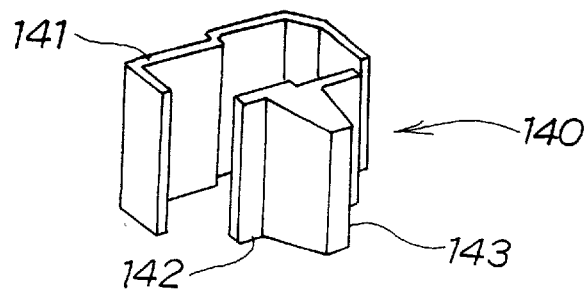
FIG. 14A–FIG. 14D are schematic perspective views illustrating clamp couplings and their applications according to the present invention.

In FIG. 14A, there is shown a clamp or split muff coupling 140, which is particularly suited for clamping two rod-like or pipe-like pieces and is comprised of a channel 141 and a tie-plate 142 confronting the opening. In the present embodiment, the tie-plate 142 is projectingly provided with a striker mounting seat 143, that is, takes the form of a T-shaped cross section.

Alternatively, a clamp or split muff coupling 140b (see FIG. 14D) may be used for clamping a tie-plate 142b (see FIG. 14D) having no projection or ridge as of the striker mounting seat 143, and the channel 141 together.

Figure 14B:
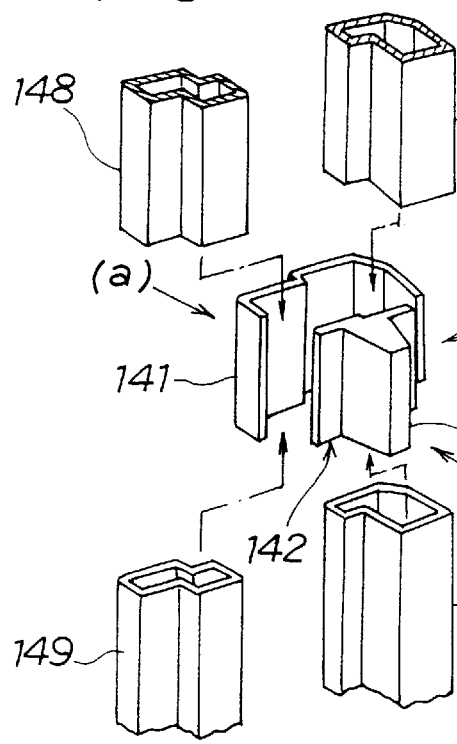
Figure 14C:
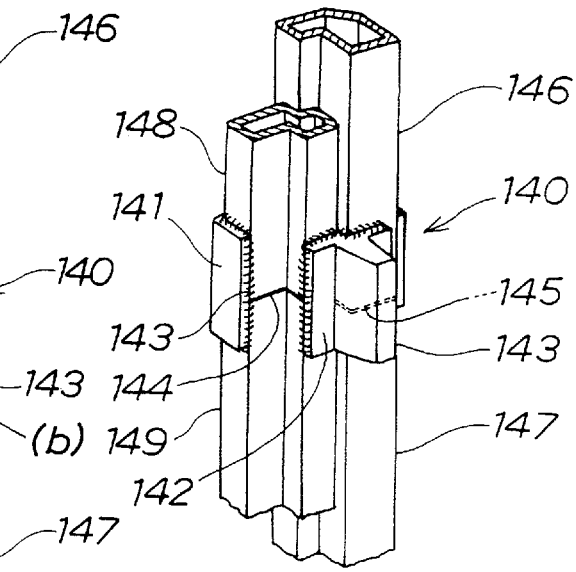

Upper and lower hollow extruded pieces 146, 147 and upper and lower hollow extruded pieces 148, 149 are joined or abutted endwise as shown in FIG. 14B. Then, the channel 141 is inserted from a back side as shown by arrow (a), followed by fitting the tie-plate 142 from a front side as shown by arrow (b).

By weld or adhesively connecting the channel 141 and tie-plate 142, the hollow extruded pieces 146–149 are firmly joined by means of the coupling 140. At this time, the joint 144 between the hollow extruded pieces 146, 147 and the joint 145 between the hollow extruded pieces 148, 149 are desirably offset in a height direction as shown in the figure for purposes of rigidity.

Figure 14D:
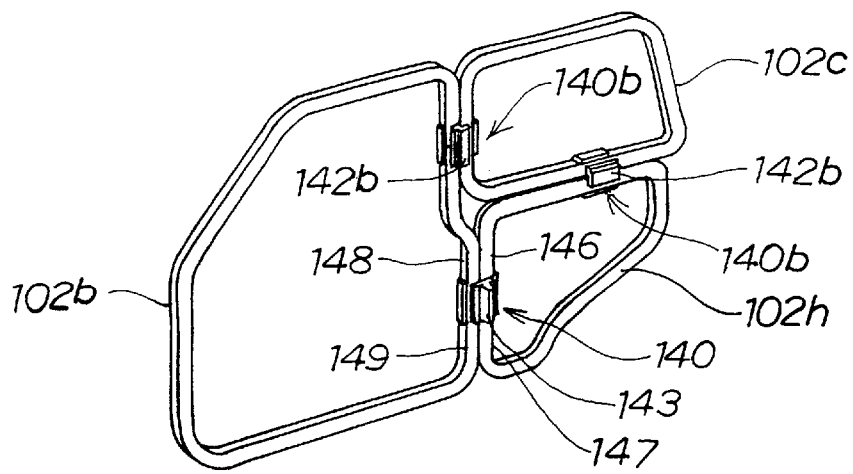

In FIG. 14D, there is shown the clamp coupling 140 as applied to connect the door opening frame 102b and an under frame 102h positioned downwardly of the quarter glass frame 102c, and a coupling 140b as applied to connect the under frame 102h and the quarter glass frame 102c and as applied to connect the quarter glass frame 102c and the door opening frame 102b.

Stated otherwise, the couplings 140 and 140b are adapted to perform two functions, namely, to join an adjacent pair of loop-shaped members 102b, 102c together and to coaxially join the upper and lower hollow extruded pieces 146, 147 (or 148 149).

Although not shown, a side of one loop-shaped member 102 may be provided with a recess while a side of another loop-shaped member 102 may be provided with a projection, whereby the two members can be mated together by fitting the projection into the recess.

Alternatively, there may be provided two loop-shaped members 102 each having a recess at one side thereof and one intermediate member of oval cross section, so that the loop-shaped members can be joined together by laying them one over the other with the intermediate member interposed therebetween.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A body frame structure composed of members extruded from a light alloy, for forming a skeletal structure of a vehicle, comprising a plurality of hollow frame members, each and every one of said hollow frame members formed from an extruded hollow member of light metal and having an overall polygonal continuous closed-loop configuration, said hollow frame members of polygonal continuous closed-loop configuration being joined together along adjacent sides thereof to form said skeletal structure, wherein each of said hollow frame members is comprised of at least two hollow frame pieces joined together by means of a split muff coupling.

2. A body frame structure according to claim 1, wherein each of said frame members is comprised of at least two hollow frame pieces joined together end to end by means of a core coupling, said core coupling being firmly received inside said two hollow frame pieces to form a joint therebetween.

3. A body frame structure according to claim 1, wherein each of said hollow frame members has a stepped portion extending at least partially along the length thereof and is joined with an adjacent hollow frame member with said stepped portion cooperatively mating with a corresponding stepped portion of said adjacent hollow frame member.

4. A body frame structure according to claim 1, wherein said split muff coupling is adapted to connect an adjacent pair of said hollow frame members.

5. A body frame structure composed of members extruded from a light alloy, for forming a skeletal structure of a vehicle, comprising a plurality of hollow frame members, each and every one of said hollow frame members formed from an extruded hollow member of light metal and having an overall polygonal continuous closed-loop configuration, said hollow frame members of polygonal continuous closed-loop configuration being joined together along adjacent sides thereof to form said skeletal structure, wherein said frame members include a windshield glass frame for receiving a windshield glass, a door opening frame for mounting a door, a quarter glass frame for receiving a rear small window glass, a roof frame as ceiling skeletal structure, a tail gate opening frame for mounting a tail gate, a bonnet opening frame for mounting a bonnet, and a front side frame for forming a front side of said body frame structure, and wherein each of said hollow frame members is comprised of at least two hollow frame pieces joined together by means of a split muff coupling.

6. A body frame structure according to claim 5, wherein a right side and a left side of said windshield glass frame are connected in juxtaposition with a side of said door opening frame to form an upper front pillar.

7. A body frame structure according to claim 5, wherein a front side of said quarter glass frame is connected in juxtaposition with part of a side of said door opening frame to form an upper center pillar.

8. A body frame structure according to claim 5, wherein a rear side of said quarter glass frame is connected in juxtaposition with part of a side of said tail gate opening frame to form an upper rear center pillar.

9. A body frame structure according to claim 5, wherein a lower side of said windshield glass frame is connected in juxtaposition with an upper side of said bonnet opening frame to form a cowl frame.

10. A body frame structure according to claim 5, wherein a front edge of said roof frame is connected in juxtaposition with an upper edge of said windshield glass frame to form a front roof rail.

11. A body frame structure according to claim 5, wherein a left edge and a right edge of said roof frame are connected in juxtaposition with an upper edge of said door opening frame to form left and right roof rails.

12. A body frame structure according to claim 5, wherein a rear edge of said roof frame is connected in juxtaposition with an upper edge of said tail gate opening frame to form a rear roof rail.

13. A body frame structure according to claim 5, wherein said door opening frame, said quarter glass frame and said front side frame are joined together to form a side frame complex.

14. A body frame structure according to claim 5, wherein each of said frame members is comprised of at least two hollow frame pieces joined together end to end by means of a core coupling, said core coupling being firmly received inside said two hollow frame pieces to form a joint therebetween.

15. A body frame structure according to claim 5, wherein each of said hollow frame members has a stepped portion extending at least partially along the length thereof and is joined with an adjacent hollow frame member with said stepped portion cooperatively mating with a corresponding stepped portion of said adjacent hollow frame member.

16. A body frame structure according to claim 5, wherein said split muff coupling is adapted to connect an adjacent pair of said hollow frame members.

* * * * *